United States Patent [19]

Golinelli et al.

[11] Patent Number: 4,573,272
[45] Date of Patent: Mar. 4, 1986

[54] AXIAL MOVEMENT GAUGING HEAD

[75] Inventors: Guido Golinelli; Mario Possati, both of Bologna, Italy

[73] Assignee: Finike Italiana Marposs S.p.A., S. Marino di Bentivoglio (BO), Italy045732724

[21] Appl. No.: 655,169

[22] Filed: Sep. 27, 1984

[30] Foreign Application Priority Data

Oct. 14, 1983 [IT] Italy .................. 3584 A/83

[51] Int. Cl.⁴ .................................. G01B 7/02
[52] U.S. Cl. ........................... 33/172 E; 339/101
[58] Field of Search ............... 33/169 R, 172 E, 558, 33/561; 174/135; 339/101

[56] References Cited

U.S. PATENT DOCUMENTS

| | | | |
|---|---|---|---|
| 2,058,752 | 10/1936 | Wray | 174/135 |
| 2,607,989 | 8/1952 | Peterson et al. | 33/23 K |
| 2,833,046 | 5/1958 | Jeglum | 33/172 E |
| 3,122,386 | 2/1964 | Pearson | 174/135 |
| 3,141,251 | 7/1964 | Olson et al. | 174/135 |
| 3,213,360 | 10/1965 | Cook et al. | 33/172 E |
| 3,434,086 | 3/1969 | Houpt et al. | 33/172 E |
| 3,670,420 | 6/1972 | Kiewicz et al. | 33/172 E |

FOREIGN PATENT DOCUMENTS

| | | | |
|---|---|---|---|
| 0031658 | 7/1981 | European Pat. Off. | |
| 386751 | 12/1923 | Fed. Rep. of Germany | 339/101 |
| 868356 | 1/1953 | Fed. Rep. of Germany | |
| 3330018 | 3/1984 | Fed. Rep. of Germany | 33/172 E |
| 237206 | 8/1945 | Switzerland | 33/172 E |
| 2065891 | 7/1981 | United Kingdom | |
| 2079467 | 1/1982 | United Kingdom | |
| 959196 | 9/1982 | U.S.S.R. | 339/101 |

OTHER PUBLICATIONS

"Feinpruf" Feinmess und Prufgerate GmbH, Millitron-Elektronisches-Langen-Mess-und Steuersystem; Issue Mt 73; pp. 28 & 29.

Primary Examiner—Richard R. Stearns
Attorney, Agent, or Firm—Stevens, Davis, Miller & Mosher

[57] ABSTRACT

A gauging head for checking linear dimensions of mechanical parts comprising a substantially cylindrical casing, a stem partially arranged for sliding movement within the casing, a feeler coupled to an end of the stem external with respect to the casing for touching the part, a transducer for providing a measurement signal and a cable for connecting the transducer to an external electric unit. An additional element can be removably and adjustably coupled to the casing for limiting the prestroke of the stem and another additional element can be removably coupled to the casing for defining the direction of exit of the cable from the gauging head.

19 Claims, 5 Drawing Figures

AXIAL MOVEMENT GAUGING HEAD

BACKGROUND OF THE INVENTION

1. Field of the invention

The invention relates to an axial movement gauging head for checking linear dimensions of mechanical parts, comprising a casing having substantially an elongated shape which defines the measurement axis, a shaft partially housed within the casing for performing a translational, axial displacement with respect to the casing, a feeler coupled to an end of the shaft for touching the part, transducer means for providing a signal depending on the amount of the displacement, and limiting means for limiting the displacement.

2. Description of the Prior Art

In most of the applications of the axial movement gauging heads, the heads are fixed to a stationary support, while the parts to be checked are displaced, manually or automatically, to the measurement position, on supports the position of which, with respect to the head position, does not change during the measurement and loading operations. Therefore, in practice each part reaches the measurement position due to the particular shapes of the feeler surface. The part, coming into contact with this surface, thrusts the feeler causing the translation, with respect to the casing, of the head movable armset, to which the feeler is fixed. The displacement, the amount of which depends on the part dimension, is transformed by a transducer into an electric signal which is transmitted to an electric power-supply and indication unit. In case it is desired to check parts having different nominal dimensions, in particular by using gauging heads having broad measurement range, this type of operation may suffer from drawbacks.

In fact, since the position of the part support is, as mentioned before, stationary with respect to the head, the part dimensions to be checked can be too short, so that no contact between the part and the feeler takes place, or too long, so that an undesired contact occurs between the part and a portion of the feeler different from the properly shaped surface. In the first case, obviously no checking is performed; in the second case there is a considerable risk of damaging the head.

In order to avoid these drawbacks without any need of retracting and releasing (through "retraction" devices) the feeler for the insertion of the part at any checking, it is necessary, when the nominal dimensions of the parts change, to modify the rest position of the feeler, and thus of the head movable armset, with respect to the part support. The devices used for this purpose are usually called devices for "pre-stroke adjustment".

A gauging head is known in which the rest position of the feeler is defined by the contact between internal surfaces of the movable armset and stop elements coupled to the casing. The stop elements are generally constituted by pins or dowels, arranged through suitable holes of the casing, and having a position adjustable from the outside. This type of solution requires considerable manufacturing costs of the moving armset, in particular for the internal surfaces involved. Moreover the use of tools is necessary for carrying out the adjustment. Furthermore the considerable additional cost of the device for the pre-stroke adjustment is not justified if, for particular applications, this device is unnecessary.

Generally, the design and construction of the known axial movement gauging heads considerably depend on the possible presence of devices for pre-stroke adjustment.

SUMMARY OF THE INVENTION

The invention as claimed is intended to remedy the drawbacks of the known gauging heads. It formulates and solves the problem of designing an axial movement gauging head including a basic structure, of simple and cheap construction and of very general use, and additional means, which can be easily and promptly coupled to the basic structure for making particular applications, in particular applications requiring pre-stroke adjustment. The advantages offered by the invention reside mainly, as far as the manufacturer of the gauging heads is concerned, in the savings of constructional costs and in the possibility of decreasing the number of products to be held in stock and, as far as the end user of the gauging heads is concerned, in the possibility of using the same basic structure, without the additional means, for the simplest applications, and with the additional means for particular applications.

Thus, the advantages are of technical, practical and economical nature.

BRIEF DESCRIPTION OF THE DRAWINGS

The invention is now described in detail with reference to the annexed drawings, given as non limiting examples, wherein.

DESCRIPTION OF THE PREFERRED EMBODIMENTS

Figure 1:
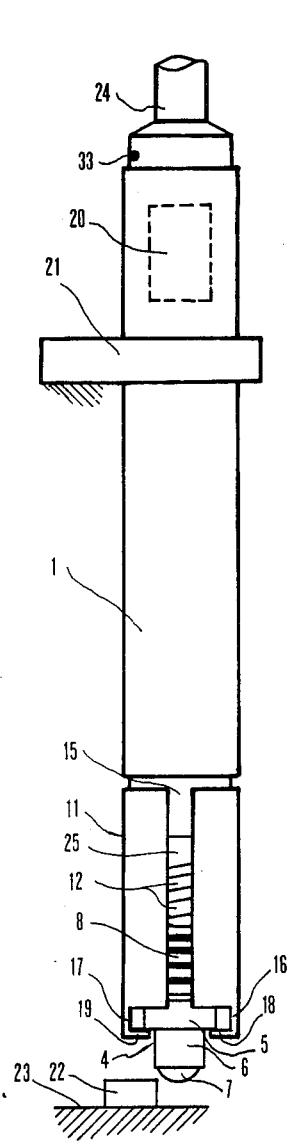
FIG. 1 is a front view of an axial displacement gauging head according to the preferred embodiment of the invention, the head being fixed to a support.
Figure 2:
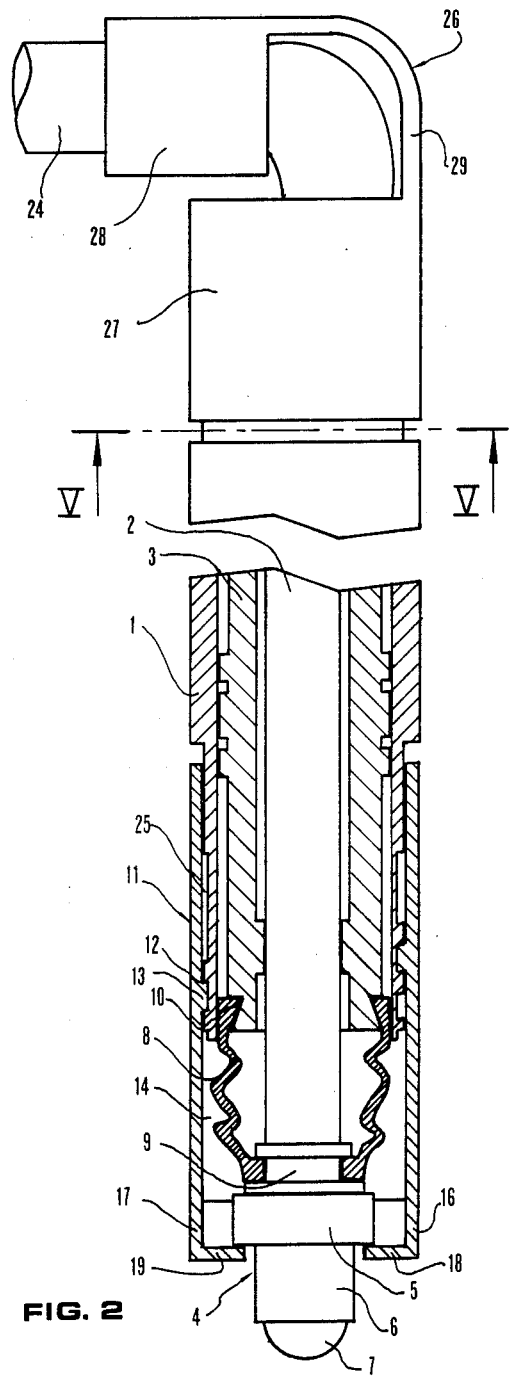
FIG. 2 is an enlarged, partially cross-sectioned elevation of the same head, with an additional variant.
Figure 4:
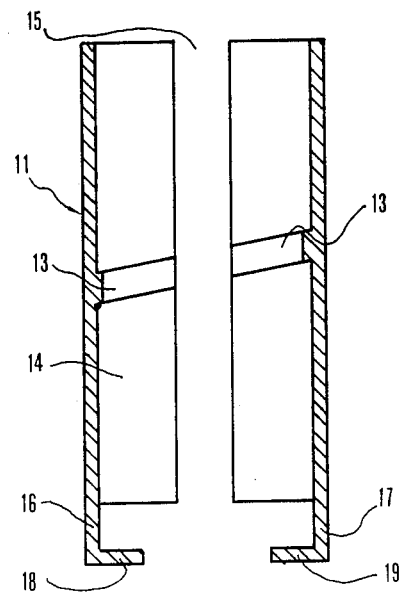
FIG. 4 is a longitudinal cross-section of the detail of FIG. 3, according to plane IV—IV.

As seen from FIGS. 1 and 2, a substantially cylindrical casing 1, which defines the head axis, houses an armset substantially comprising a stem or shaft 2 partially arranged within casing 1 through a guide element 3 permitting a mutual sliding displacement of axial translation between shaft 2 and casing 1. Fixed to the end of shaft 2 coming out of casing 1 is a feeler 4 comprising a portion 5 of longer diameter, adapted to make easier the manual operations for securing feeler 4 onto shaft 2 and for removing it, and a portion 6 whereto is fixed (generally glued) an element 7 made of widia, having a surface with the shape of a spherical portion and adapted to touch the mechanical part to be checked.

A bellows seal 8 has an end fixed to an annular seat 9 obtained in shaft 2 and another end fixed to an annular seat 10 defined by guide element 3 and casing 1.

A tubular element 11, substantially cylindrical, is externally and adjustably fixed to the surface of casing 1.

In particular, the external surface of casing 1 has a helical groove 12, having a rectangular cross-section, to which is coupled a helical ridge 13, having a rectangular cross-section, too, which protrudes with respect to the internal surface 14 of tubular element 11. Moreover, element 11 has a longitudinal cut 15 rendering element 11 resiliently deformable, thus permitting its coupling with casing 1 in a position defined by the engagement of ridge 13 with groove 12.

An end of tubular element 11 is free, i.e. axially protrudes, with respect to casing 1; this end has two L-shaped shoulders 16 and 17; the L bases, respectively 18 and 19, are oppositely arranged and define a plane perpendicular to the head axis. Shaft 2, and thus feeler 4 are urged outwardly with respect to casing 1 by a spring, not shown in the figure; shaft 2 can slide within element 3 and the end of this stroke is defined by the cooperation between feeler 4 and resilient element 11, in particular by the contact of portion 5 of feeler 4 against the stops constituted by bases 18 and 19 of the L-shaped shoulders 16 and 17 of element 11.

The resilient coupling of element 11 onto the surface of casing 1 is facilitated by the particular outline of this surface. In fact, as seen from FIG. 2, casing 1 features, near the end whereto element 11 is fixed, changes in its external diameter, in particular a diameter reduction 25 permitting to decrease undesired friction in the coupling between the casing 1 and element 11, and thus facilitating the operations for assembling and manually adjusting resilient element 11. It is also pointed out that element 11, by covering almost totally seal 8, provides a safe protection for it.

The operation of the head is as follows.

The head is fixed in a known way to a support 21 (FIG. 1); the part 22 to be checked is moved (for example, automatically) toward feeler 4, on a support 23 arranged at a determined distance from support 21. When part 22 comes into contact with feeler 4, the particular shape of element 7, defining a spherical portion, causes a component of the force applied by part 22 to lie on the head axis, thus bringing about the sliding of shaft 2 within element 3 and thus within casing 1. This displacement is then detected by transducer means (for example by a differentialtransformer position-transducer)—schematically shown and denoted by reference numeral 20 in FIG. 1—, which transmit, through a cable 24, a signal depending on the amount of this displacement to an external power supply and indicating electrical unit.

If the nominal dimension of the part to be checked 22 is such that feeler 4 contacts part 22 with its portion 6 or that part 22 passes beneath feeler 4, without any contact, then—of course—the head does not operate as desired.

In this case, if the nominal dimension of the parts to be checked 22 changes, it is necessary to modify the rest postion of feeler 4, and thus the pre-stroke, in order that part 22 may contact the feeler 4 and that the contact takes place just with element 7. For this purpose, the position of stops 18 and 19 is axially displaced with respect to casing 1, by manually rotating tubular element 11; in fact, as a consequence thereof, the displacement of helical ridge 13, restrained within helical groove 12 of casing 1, gives rise, for the motion of tubular element 11 and thus of stops 18 and 19, to a translational component with respect to casing 1.

The radial interference provided for the relevant surfaces, the elasticity of element 11 and the portions of the end part of casing 1 which have different diameters, guarantee the stability of the pre-stroke adjustment.

Particular applications of the gauging heads feature, for dimensional problems, a cable coming out along a direction perpendicular to the head axis. Accordingly, in the known heads the passage hole can be arranged in the side surface of the head. Therefore, the known axial displacement gauging heads are of two different types, depending on the arrangement of the cable exit. A more flexible solution, permitting the use (and thus the manufacturing) of one type of head only, is obtained by the provision of a particular device 26 permitting to achieve a direction of exit of cable 24 perpendicular to the head axis, whenever required by the specific use of the head.

Figure 5:
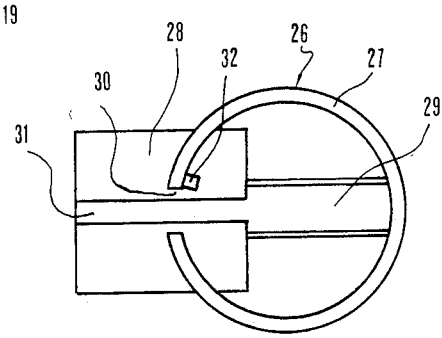
FIG. 5 is a bottom view, according to plane V—V of FIG. 2, of a second additional detail.
Figure 3:
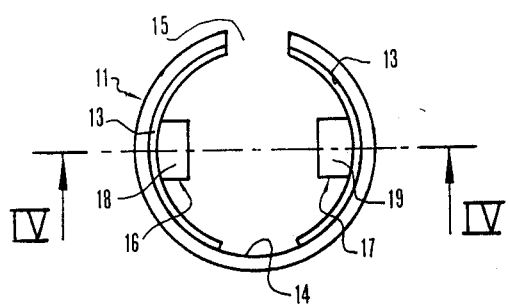
FIG. 3 is a top view of an additional detail of FIG. 2.

This device, shown in FIGS. 2 and 5, substantially comprises two tubular portions 27 and 28 connected with each other through an arcuate portion 29, defining external (convex) and internal (concave) surfaces, and being shaped in such a way that the axes defined by portions 27 and 28 are perpendicular to each other. The cable 24 faces the internal surface of portion 29, the latter so constituting a further protection for cable 24 close to its bending part (see FIG. 2) Portions 27 and 28 have longitudinal cuts 30 and 31 rendering them resiliently deformable. Therefore portion 27 is elastically coupled to casing 1 near the end portion of the latter through which cable 24 comes out; the internal cylindrical surface of portion 27 has a dog 32 which can engage a notch 33 obtained in the external surface of casing 1.

Dog 32 and notch 33 realize locking means, and in this way the resilient coupling between casing 1 and device 26 is rendered more stable, and in particular, mutual rotations with respect to the head axis are prevented.

Moreover, cuts 30 and 31 permit the insertion of cable 24 within portions 27 and 28, when applying the relevant device, without any need to detach the connector (not shown) coupled to the end of cable 24 for connection with the power supply and indicating electrical unit.

The operation of the device is evident. The device is applied as described above and cable 24 is compelled, where it comes out from the head, to lie within tubular portion 28, which defines an axis perpendicular to that of portion 27 concentrically coupled to casing 1. Therefore, in correspondence with the outer end of portion 28 the cable axis is arranged in a plane perpendicular to the head axis.

It is pointed out that the additional means consisting of elements 11 and 26 are simple and cheap and moreover very practical for their assembling, without requiring, for this feature, particularly expensive machining operations. Consequently, it is possible to use the same basic type or structure of head for different uses, through the simple assembling of the additional means or devices of above, if necessary.

A further additional device which may be used is a tubular resilient element similar to the above described element 11 and, like that, adjustably coupled to casing. The relevant stop elements are adapted to cooperate with a surface of feeler 4. such a way as to limit the stroke of the armset in the direction along which the armset is urged by the part to be checked.

Another similar device may have two pairs of stops for limiting the stroke of shaft 2 in both directions, the two stops being simultaneously adjustable in the manner described above; in this case the total stroke which shaft 2 can travel remains constant. A different embodiment may foresee the use of two distinct tubular elements coupled to casing 1, and thus separately adjustable, for limiting the stroke of the movable armset in both directions and also for varying the total amount of the stroke.

We claim:

1. An axial movement gauging head for checking linear dimensions of mechanical parts, comprising a casing having substantially an elongated shape which defines the measurement axis, a shaft partially housed within said casing for performing a translational axial displacement with regard to the casing, a feeler coupled to an end of the shaft for touching the part, transducer means for providing a signal depending on the amount of said displacement, and limiting means for limiting said displacement and defining a rest position for the feeler, wherein the limiting means comprise a limiting element externally arranged and axially adjustable with respect to the casing through a resilient coupling, the limiting element being adapted to cooperate with said end of the shaft for defining the rest position of the feeler.

2. The head according to claim 1, wherein said limiting element comprises a side surface having a longitudinal cut for providing said resilient coupling between the limiting element and the casing.

3. The head according to claim 1, wherein said limiting element comprises stop elements adapted to cooperate with said end of the shaft.

4. The head according to claim 3, wherein said stop elements have substantially L shapes and the L bases are oppositely arranged and define a plane perpendicular to the measurement axis.

5. The head according to claim 4, wherein said casing and said limiting element have substantially cylindrical tubular shapes and define a coupling device including a ridge and a groove.

6. The head according to claim 5, wherein the casing has cylindrical surfaces with different diameters for facilitating the operations for the assembling and manual adjustment of the limiting element.

7. The head according to claim 1, further comprising a resilient seal coupled to the shaft and the casing, said seal being arranged at the interior of the limiting element.

8. The head according to claim 1, further comprising an electric cable for transmitting said signal to an external processing unit, and an additional element externally and removably coupled to the casing for cooperating with the cable and defining the direction of exit of the cable from the head.

9. The head according to claim 8, wherein said additional element essentially comprises a first portion, defining a first direction and securing the additional element to the casing, a second portion defining a second direction and housing the cable, and a third connecting portion.

10. The head according to claim 9, wherein said first direction and second direction are perpendicular to each other.

11. The head according to claim 9, wherein said first portion and second portion have substantially tubular shapes and include side surfaces having longitudinal cuts rendering the first and second portions resiliently deformable, for the coupling of the first portion with the casing and for the insertion of the cable within the first and second portions.

12. The head according to claim 11, wherein said casing and said first portion have substantially cylindrical shapes and define a coupling device including a notch and a dog.

13. A gauging head for checking linear dimensions of mechanical parts, comprising a casing having substantially an elongated shape which defines a measurement axis, a shaft partially housed within said casing for performing a translational axial displacement with regard to the casing, a feeler coupled to an end of the shaft for touching the part, transducer means nfor providing a signal depending on the amount of said displacement, an electric cable for connecting the transducer means to an external electric unit, an additional element externally and removably coupled to the casing for cooperating with the cable and defining the direction of exit of the cable from the head, and locking means for defining and locking the position of the additional element with respect to the casing, wherein said additional element essentially comprises a first tubular portion defining a first direction, a second tubular portion defining a second direction and a third connecting portion having substantially an arcuate shape and defining a convex external surface and a concave internal surface, the first portion being adapted to cooperate with the casing and with the locking means for securing the additional element to the casing, the second portion housing the cable, the cable facing said concave internal surface of the third connecting portion.

14. The head according to claim 13, wherein said first direction and second direction are perpendicular to each other.

15. The head according to claim 13, wherein said first portion and second portion include side surfaces having longitudinal cuts rendering the first and second portions resiliently deformable, for the coupling of the first portion with the casing and for the insertion of the cable within the first and second portions.

16. The head according to claim 15, wherein said casing and said first portion have substantially cylindrical shapes and said locking means comprise a coupling device including a notch and a dog.

17. A gauging head for checking linear dimensions of mechanical parts, comprising:
a substantially cylindrical casing defining a longitudinal axis;
a stem arranged for sliding movement within said casing, along said longitudinal axis, the stem having an end external with respect to the casing;
a feeler fixed to said end of the stem, for touching the part to be checked;
transducer means arranged within said casing for detecting the displacements of the stem;
limiting means arranged externally and adjustably coupled with respect to the casing, for cooperating with said end of the stem and limiting said displacement along one direction; an electric cable for connecting the transducer means to an external electrical unit;
and a device externally and removably coupled to the casing for cooperating with the cable and defining the direction of exit of the cable from the gauging head.

18. The gauging head according to claim 17, wherein said limiting means are manually adjustable and removable with respect to he casing.

19. The gauging head according to claim 18, wherein said device comprises an element having a first portion, a second portion and an intermediate portion, the first portion being adapted to be coupled to an end of the casing, concentrically with the casing, and the second portion being adapted to house a portion of the cable along a direction different from that of said longitudinal axis.

* * * * *

UNITED STATES PATENT AND TRADEMARK OFFICE
CERTIFICATE OF CORRECTION

PATENT NO. : 4,573,272

DATED : March 4, 1986

INVENTOR(S) : Guido GOLINELLI and Mario POSSATI

It is certified that error appears in the above-identified patent and that said Letters Patent is hereby corrected as shown below:

Column 3, line 38, "differentialtransformer" should be --differential-transformer--.

Column 4, line 56, "4. such" should be --4, in such--.

Column 6, line 4, "nfor" should be --for--;

Column 6, lines 50-52, the portion beginning with "an electric cable" should constitute a separate paragraph.

Column 6, line 59, "he" should be "the".

Signed and Sealed this

Eighth Day of July 1986

[SEAL]

Attest:

DONALD J. QUIGG

Attesting Officer

Commissioner of Patents and Trademarks